(12) United States Patent
Snyder

(10) Patent No.: US 11,210,708 B2
(45) Date of Patent: Dec. 28, 2021

(54) RESPONSIVE ADVERTISEMENT FOOTPRINT AND FRAMEWORK

(71) Applicant: A.D. Objects, Inc., Vancouver (CA)

(72) Inventor: Matthew Snyder, Vancouver (CA)

(73) Assignee: ADObjects, Inc., Vancouver (CA)

( * ) Notice: Subject to any disclaimer, the term of this patent is extended or adjusted under 35 U.S.C. 154(b) by 873 days.

(21) Appl. No.: 14/721,597

(22) Filed: May 26, 2015

(65) Prior Publication Data

US 2015/0254732 A1 Sep. 10, 2015

Related U.S. Application Data

(63) Continuation of application No. 13/668,336, filed on Nov. 5, 2012, now abandoned.

(60) Provisional application No. 61/555,111, filed on Nov. 3, 2011.

(51) Int. Cl.
*G06Q 30/02* (2012.01)

(52) U.S. Cl.
CPC ..... *G06Q 30/0276* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 6,226,692 B1 * | 5/2001 | Miloushev | G06F 8/36 719/316 |
| 8,832,559 B2 | 9/2014 | Mentchoukov et al. | |
| 8,881,033 B2 | 11/2014 | Mentchoukov et al. | |
| 9,575,934 B2 | 2/2017 | Mentchoukov et al. | |
| 2005/0096980 A1 * | 5/2005 | Koningstein | G06Q 30/0275 705/14.41 |
| 2009/0171920 A1 * | 7/2009 | Wade | G06F 16/951 |
| 2009/0197581 A1 * | 8/2009 | Gupta | G06Q 30/02 455/414.2 |
| 2010/0293602 A1 * | 11/2010 | Uchida | G06F 21/608 726/4 |
| 2011/0231265 A1 * | 9/2011 | Brown | G06Q 30/0277 705/14.73 |

OTHER PUBLICATIONS

Marcotte, Ethan, Responsive Web Design, May 25, 2010, https://alistapart.com/article/responsive-web-design/, pp. 1-52 (Year: 2010).*

* cited by examiner

*Primary Examiner* — John Van Bramer
(74) *Attorney, Agent, or Firm* — Dentons US LLP

(57) ABSTRACT

A responsive advertising system is described herein that provides a single responsive advertisement footprint that can work cross any screen size or ad placement and converge online and mobile advertising. Bringing together everything in a way to contain or include various formats or components in a common toolkit is presented for the first time herein. The system allows a given advertisement unit to be flexible enough to change size and shape to work across different publishing properties (e.g., website, mobile application, email, and so forth) in an efficient, optimizable, trackable, and universal way. Thus, the responsive advertising system allows advertisers to expand their reach to more device types while reducing administrative burden in managing multiple advertisements for cross-screen or channel delivery.

27 Claims, 6 Drawing Sheets

RESPONSIVE ADVERTISEMENT FOOTPRINT AND FRAMEWORK

CROSS-REFERENCE TO RELATED APPLICATIONS

The present application is a continuation of U.S. patent application Ser. No. 13/668,336 entitled, "RESPONSIVE ADVERTISEMENT FOOTPRINT AND FRAMEWORK," and filed on 2012 Nov. 5, which claims the benefit of U.S. Provisional Patent Application No. 61/555,111 entitled, "RESPONSIVE ADVERTISEMENT FOOTPRINT AND FRAMEWORK," and filed on Nov. 3, 2011, each of which is hereby incorporated by reference.

The present application is related to U.S. patent application Ser. No. 14/063,685 entitled, "STORY-BASED, MULTI-SCREEN ADVERTISING FRAMEWORK," and filed on 2013 Oct. 25, which claims the benefit of U.S. Patent Application No. 61/718,187 entitled "RESPONSIVE MULTISCREEN ADVERTISING FRAMEWORK," and filed on Oct. 25, 2012, each of which is hereby incorporated by reference.

BACKGROUND

The market for mobile, online, and tablets is converging very rapidly with web tool evolution around Cascading Style Sheets version 3 (CSS3), Hypertext Markup Language version 5 (HTML5), and JavaScript technologies giving lots of opportunity for integrated designs. In May 2010 Ethan Marcotte (author of a book about adaptive, flexible grid-based web design) coined the phrase "Responsive Web Design" as a method of having the same web page adapt to different sizes based on browser widths used by clients to view the web page. Media queries are a CSS feature that allows detection of device viewport at a web server to adapt content. Based on leveraging media queries in addition to CSS3, HTML5 and fluid-grids, this new web design technique has presented itself as a potential to become the standard in web design. The methodology makes it easier to keep the exact same web site content and have it display for multiple different views.

Typical views may include a desktop computer that has a large, relatively square screen (i.e., large width and height to display content), a netbook/laptop type computer with a smaller but also relatively square screen, a tablet computer with a tall and wide screen, and a smartphone with a tall and relatively thin screen. Each of these types of views implies different formatting for the content displayed on them. For example, a desktop may have sufficient screen real estate to display multiple columns of information, and thus a site with articles may choose to display three or more columns, potentially with advertisements above, below, and to the sides of the content. A smartphone, on the other hand, may have room for only one column of information, and any advertisements may have to fit in column with the other content, or as a thin banner above or below the content. These differences in views and devices imply substantial work on the part of content publishers and advertisers.

In parallel to this trend, digital advertisement formats have also evolved as well as the serving and other technologies that surround them. However, solutions have been consistent for any given view. Advertisement unit footprints have been fixed as a position and size in the website, with the evolution of new innovative techniques for rich-media delivering, tracking, verifying, and dynamically changing the content only for each of these footprints has been the main driver that has emerged with HTML5 web tools in general. The massive innovation around advertisement technology for online websites, versus the innovation for mobile advertisement technology has been totally separated in the industry. Different companies focusing on the different channel of online or mobile has been the status-quo. Mobile advertising has been thought of as a way to monetize mobile websites or applications with new units and development platforms. Many of the mobile technology companies have shown mobile to be something different that involved a separate technology and strategy. Examples of this can be found with the many rich media mobile advertisement units (footprints) that have evolved in HTML5 with IAB (Internet Advertising Bureau) standard sizes (e.g., 728×90, 300×250, etc.).

For advertisers that want to reach users wherever they are, and whatever devices they use, this can involve substantial administrative challenges. Advertisers may have to manage one set of marketing content for traditional desktop devices and another set of marketing content for newer mobile devices. Changes to an advertising campaign may involve updating multiple, separate delivery systems and errors may lead to an inconsistent marketing message. For example, a mobile campaign may fall out of date while an advertiser focuses on his or her non-mobile campaign. In addition, failure to consider particular device types and to provide advertisements for those device types may lead to missed opportunities to reach users. For example, an advertiser that is not well versed in current trends may fail to reach mobile users at all, or may underestimate the significance of a newly emerging type of mobile platform.

DETAILED DESCRIPTION

A responsive advertising system is described herein that provides a single responsive advertisement footprint that can work cross any screen size or ad placement and converge online and mobile advertising. Bringing together advertising assets in a way to contain or include various formats or components in a common publishing toolkit (which can be used by publishers, agencies, brands, and others) is presented for the first time herein. The system allows a given advertisement unit to be flexible enough to change size and shape to work across different publishing properties (e.g., website, mobile application, email, and so forth) in an efficient, optimizable, trackable, and universal way. Some goals of the system are to provide: 1) adaptive sizing of an advertisement footprint depending on the view characteristics of a viewing client, 2) an integrated framework for managing marketing content across view types, and 3) cross-platform tracking techniques for users or behavior profiles for advertisement network targeting. The integrated framework includes graphical assets such as images, videos, and text fonts but may also include concepts like providing a carriage or caddy for ad-tags, advertising technologies (creative, applications, or even a responsive web page, app, or widget), analytics tags, and verification and inventory management platforms that can dynamically manage either mobile or online environments and can be reported back to the advertiser, publisher, or administrator of an advertisement management component of the system. Thus, the responsive advertising system allows advertisers to expand their reach to more device types while reducing administrative burden in managing multiple advertisements for cross-screen or channel delivery. These concepts are described in further detail herein.

Example System Components

Figure 1:
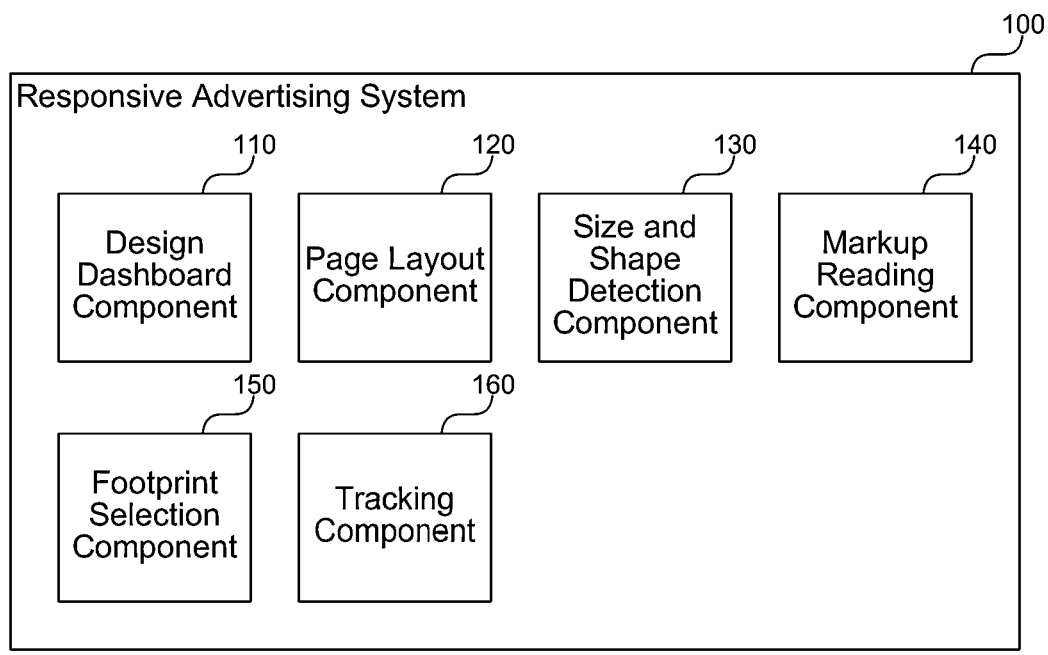
FIG. 1 is a block diagram that illustrates components of the responsive advertising system, in one embodiment.

FIG. 1 is a block diagram that illustrates components of the responsive advertising system, in one embodiment. The system 100 includes a design dashboard component 110, a page layout component 120, a size and shape detection component 130, a markup reading component 140, a footprint selection component 150, and a tracking component 160. Each of these components is described in further detail herein.

The design dashboard component 110 provides a control panel through which a user of the system (which may be a publisher, agency, brand, or other entity) can design an advertising footprint containing multiple positions within a web page for an advertisement and advertising units having adaptable sizes to fit to an available region of a responsive web site. The footprint is a package of multiple advertisement items and information (assets), some, all, or none of which may be rendered for a particular instance of displaying a web page, depending on the context surrounding the request to display the page and the information in the footprint which specifies when various possible advertisement formats are turned on and used or off and not used, and what dimensions into which they will each be sized. The advertisement items may each be used for a different possible format of the advertisement, such as banner, skyscraper, rectangle, or other advertisement formats, as well as different layouts of the advertisement (e.g., large picture over text, no picture just text, wrapped and narrower text, and so forth). In addition, each advertisement item may have the ability to be fit to a variety of sizes. For example, the layout of an advertisement may specify how the advertisement will look if a width of 100, 150, or 200 is available. Elements of the advertisement may be linearly sizeable to any size with a possible minimum (e.g., if an image will not fit below a certain width then this advertisement might be turned off, moved, or given another format that does not contain the image or with a different image to fit smaller widths) and/or maximum dimension.

The design dashboard 110 handles the authoring phase of creating an advertisement footprint suitable for use by the other components of the system below to provide dynamic sizing and selection of particular advertisements when they are rendered to a user. The information contained in the advertising footprint may specify a script or similar information that uses client screen size, browser width, device type, user identity, or other characteristics to determine under which circumstances to display which advertising items. This information may be either automatically determined by the system 100 or received from an administrator through a control panel user interface provided by the design dashboard component 110. Once the authoring phase is complete, the component 110 stores the completed framework footprint in a data store for access by a web server when a client requests one or more web pages that refer to the framework.

The framework footprint generated by the design dashboard component 110 contains multiple advertisement layouts that can be adjusted to fit any size and format (e.g., desktop and mobile) for use in particular situations relevant to the user. The framework footprint is then referenced (e.g., by a tag, link, or other technique that will cause the framework to load and its code to be executed when the web page is loaded) in a web page where the framework is to be used for displaying advertisements. The framework may be referenced directly and installed on the page (and act as a first party ad server), may be retrieved dynamically from an ad server, or may be a third party ad server itself referenced in a tag within the page. The terms "framework" and "reference" to the framework are intended herein to allow flexibility in the method, called the "reference", in which the bundle of possible advertising units, called the "framework", is associated with the page. Thus, the framework footprint is associated with a web page with multiple potential footprint areas that are locations on the web page where advertisements can appear at various sizes appropriate to the client space. Once a location on the page is selected to receive an advertisement, and an advertisement appropriate for that location is selected, the system dynamically sizes the selected layout to fit the available space of the location. The footprint framework is a type of container that may include various types of assets, such as display advertising images, video advertising, rich media advertising, advertising ad-tags, and responsive web design widgets as determined by the user of the system.

The page layout component 120 operates to lay out and recognize the elements on a page for display to a page visitor using a client device. A page could be a web page, native application page, or other user interface like those typically defined with markup language. The page layout component 120 may have either server or client sub-components or both. For example, a PHP server may host a web page and may determine the final markup content of the web page to server to a client device. PHP allows web authors to include various dynamic script behavior so that markup varies per user, per device type, or for other reasons. The client, upon making a hypertext transfer protocol (HTTP) or similar request may specify client device and user information in a user-agent or other property that the server can use to dynamically select what content to provide to the client. Once on the client, the markup (e.g., hypertext markup language (HTML) or other) provided by the server may include JavaScript or other dynamic code that is executed at the client to further modify the behavior of the web page. In modern websites, technologies such as asynchronous JavaScript and XML (AJAX) may be used to coordinate between client and server to dynamically modify the content of a web page without refreshing and re-retrieving the entire web page from the server.

Responsive web design is a method of authoring and serving web content that allows the web content to adapt to a user's client device display area. The design of the web content is such that it will reorder, resize, and layout itself dynamically based on the available screen region into which it is being displayed. Fluid layout is used to describe a type of responsive web design in which each web page is built using a system or relative units rather than pixels. A fluid grid using percentages can be used to indicate how much space each component of a web page is intended to consume. For example, one column of text might consume the left 50% and another column of text might consume the right 50%. At actual display time, what actual size 50% is will vary. It could be 50 pixels for a smartphone and 500 pixels for a desktop computer, but regardless the site is designed to determine and adapt to whatever the reality is at the time of display.

This type of web design created huge problem for advertising, which lived in a world up until 2011 of standardized, absolute advertisement footprint sizes. The responsive advertising system 100 described herein solves this problem by making advertisements also fluid or responsive, like the rest of the web content on the page. This allows the page designer, for example, to specify that the top 10% or right 25% of the page is available for an advertisement, and for the system 100 to fit an advertisement from the framework footprint described herein into whatever available space that actually is at display time. One method of implementing this concept uses media queries, which were introduced in the CSS3 specification, which allow a web designer to create conditional stylesheets based on available width, height, orientation, and other factors. There are many types of media queries, but ones such as min-width, max-width, min-device-width, max-device-width, orientation, and webkit-min-device-pixel-ratio are examples of very useful media queries for determining breakpoints at which the layout of a particular advertisement using the responsive advertising system will change (e.g., to another layout, size, content, or modify other parameters).

The size and shape detection component 130 detects characteristics of the client device that affect the environment, including size and shape, in which the laid out web page will be rendered. For example, the component 130 may detect the device type (e.g., smartphone, tablet, laptop, desktop, particular model such as iPhone 4, and so forth), screen size (e.g., in pixels or other units), browser window width (e.g., if the browser is not consuming the full screen), container size of where an advertisement will be placed into (based on information fed back from the page layout component 120), and other characteristics that affect the area in which web page content will be displayed. Like the page layout component 120, the size and shape detection component 130 may have some operation at the server and/or the client. The server can detect screen size through the user-agent property, by previous history of the user, or by other mechanisms. The client can use JavaScript and a document object model (DOM) or other techniques to dynamically query the available browser width, client device type, and other information. The size and shape detection component 130 may also detect identifying information of the user that is requesting the web page, which can be used for analytics, content customization, and targeted advertising. This information can be provided to a server component or used at the client to dynamically select advertising content suitable for the user, to track user behavior, or for other purposes.

Within the web page of a fluidly designed responsive web site, the size and shape detection component 130 may determine the sizes and shapes of various slots within the page into which content will be sized. This may include one or more advertising slots (placements) in which advertisements can be placed, that are sized dynamically to the available space of a particular client device.

The markup reading component 140 reads the markup delivered by the page layout component 120 and identifies both main content of the web page and one or more variable-sized locations of the web page that can contain advertising content. The markup reading component 140 may be the rendering engine of a web browser, a crawler of a search engine, or other component that reads and understands the meaning of one or more markup languages. The system 100 does not specify a fixed position or size for advertisements, but rather provides a footprint framework that is a bundle or package of possible advertisement layouts and positions. The system 100 dynamically uses this footprint framework when the web page is rendered on a particular client device to determine the advertisement placement and layout most appropriate for that particular client device.

The footprint selection component 150 reads a footprint framework created by the design dashboard and associated with a particular web page being prepared for display on a client device, selects from among the multiple layouts and positions of advertisements and assets contained within the framework footprint to select one or more layouts and positions of advertisements to display on the particular web page being prepared for display, and dynamically adapts the size and shape of the selected advertisements to fit the detected client characteristics. The positions of advertisements on the web page are not fixed as in past web advertising technologies. Rather, they can vary based on characteristics of the client device detected by the size and shape detection component 130. In addition, even at any given position the size of advertisement used may vary by client device. For example, although a web page may include a banner advertisement across the top of the page for both desktop and smartphone client devices, the width of advertisement selected for the smartphone will generally be smaller and may even include different content of the advertisement, such as a shorter tag line or other text that is better optimized to mobile display.

Thus, neither size nor position of advertisements provided by the system 100 are static, a limitation of systems of the past. In addition, the dynamically sized and positioned advertisements of the system 100 described herein allow for a natural adaptation of advertising strategy to mobile and desktop environments. No longer do advertisers need to think completely separately about these two important environments and no longer does technology for the two need to evolve separately. The system 100 can turn on and off particular advertising slots, resize particular advertising slots, and retrieve different content for advertising slots depending on the detected characteristics of the client device and/or user of the device.

The tracking component 160 provides reporting and tracking of how advertisements are actually used by one or more client devices. Reporting provides cross-screen information to advertisers such as the types of devices being used to consume their content, which sizes of advertisements were seen by how many users, which advertisements were most effective (e.g., based on click through or other metrics), and so forth. Tracking provides information on particular user behavior, such as how many repeat visitors requested a web page, whether a particular known user purchased an item advertised on the web page, whether the user interacted with the advertisement (e.g., by clicking, hovering over, or pausing to read the advertisement), and so on. The advertising framework can offer complete cross-screen analytics capability (between devices) with one creative entity.

The tracking component 160 can provide unified reports across desktop and mobile environments, so that advertisers no longer have to manage these two important environments separately. It is possible to know with the system 100, for example, that a particular user started viewing a web page and saw an advertisement on a desktop computing device, and then continued viewing the same page later on a mobile computing device, which may have ultimately resulted in a purchase. The component 160 delivers information about context, browser, and device type being used to view a web page and associated advertisements. The component 160 provides analytics data based on specific users accessing a web page, and can provide specific metrics common to the industry such as click-through rate, effective cost per thousand impressions, and cost per click.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, tablet computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Although the term "web page" is used herein to describe places where the advertising framework can be utilized, those of ordinary skill in the art will recognize that web technology and content can appear in many different places today. For example, in car technology, web appliances, mobile applications, smart watches, email, and other areas can all use the techniques described herein to dynamically size and position advertising content. Thus, use of the term "web page" is meant to be one example application of this technology and does not limit the use of the technology in these other areas.

Example Processes

Figure 2:
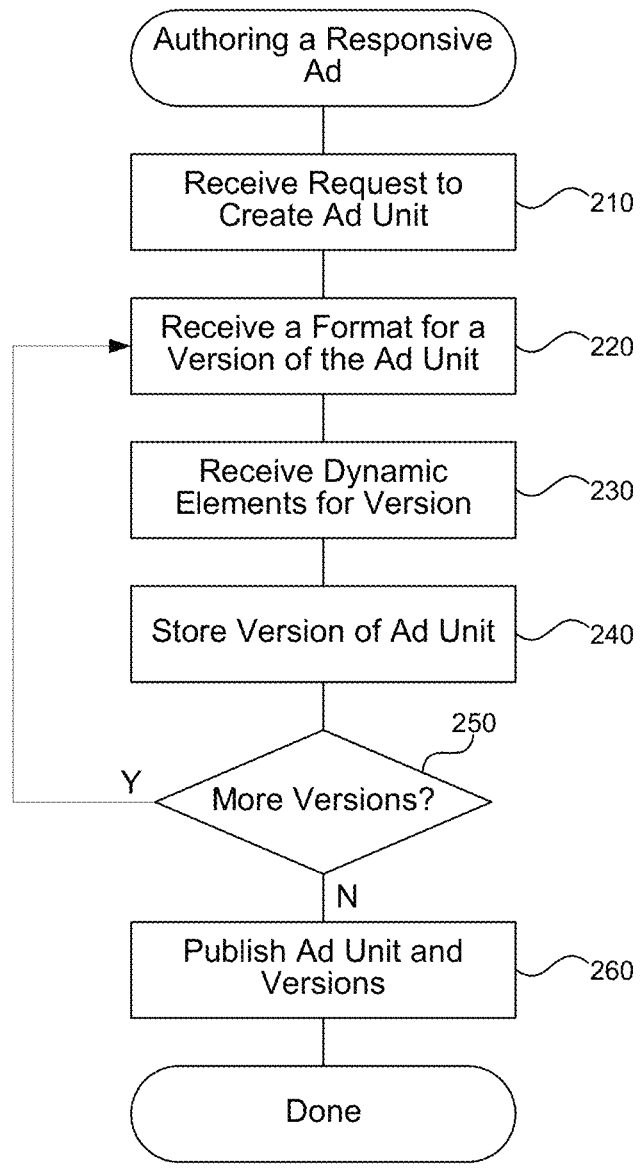
FIG. 2 is a flow diagram that illustrates processing of the responsive advertising system to author and publish an advertising framework, in one embodiment.

FIG. 2 is a flow diagram that illustrates processing of the responsive advertising system to author and publish an advertising framework, in one embodiment. The advertising framework is a responsive advertisement unit that dynamically changes for different clients, in one embodiment. Beginning in block 210, the system receives a request from an advertising author to create an advertisement unit having dynamic format and content for multiple client devices. For example, the author may visit an authoring tool provided as a web page or other interface by the system and may request to create a new advertising unit and/or campaign. The system may provide a profile for each author where the author can log in to view published advertisements and to create a new advertisement or the dynamic elements or creatives of an existing advertisement using the framework described herein. The author may define the parameters of what is included in the framework per size and shape as well as the positioning and transition of those elements as described further below.

Continuing in block 220, the system receives a format for a first version of the advertisement unit. The author may start by selecting an overall starting size, maximum size, or initial size for the advertisement (e.g., 2560×1400 in the case of a full page advertisement) and the system may provide a blank canvass onto which the author can drag or otherwise specify elements to include in the advertisement. The authoring environment may include a toolbox of potential elements (e.g., text boxes, images, videos, audio, applets, and so on) as well as allowing the author to add custom element types to the advertisement unit. In addition, the author can specify the dynamic sizing properties of each element, using techniques of responsive web design described herein, and applying them to the advertising content itself.

Continuing in block 230, the system receives one or more elements and layout information for the received elements that will comprise the content of the first version of the advertisement unit. For example, the author may select an element, such as a text box, and the author may place the element at a particular location within the version of the advertisement unit. The author may also resize the element, position the element, or define its transition, to define its boundaries, as well as specifying content of the element, such as text to display, formatting of the text, and so forth. The author continues in this manner until he or she has added all of the desired elements to this version of the advertisement unit. The author may also specify conditional information associated with elements that are conditionally displayed or for which the formatting is based on values associated with one or more conditions that will be evaluated at the time of serving and/or displaying the advertisement. The conditions may specify which advertising units will be turned on or off (e.g., visible versus hidden) and how advertising units that are turned on will be sized as well as similar information within each advertising unit (which elements will be turned on and off, and how the elements will be sized). As part of these conditions, the position and transition of elements may be part of this process.

Continuing in block 240, the system stores the first version of the advertisement unit as defined by the advertisement author. The system may include one or more data stores for storing received advertisement frameworks, and from which an advertisement server of the system accesses advertisement frameworks upon receiving requests to display web pages containing the advertisement frameworks.

Continuing in decision block 250, if the advertising author requests to define more versions of the advertisement unit for other potential client devices or screen formats, then the system loops to block 220 to receive those additional versions and associated elements and formatting information. An author may specify versions for each of the types of client devices expected to display the advertisement, versions for different screen sizes, versions for different browser window sizes, as well as default versions of the advertisement to be displayed when no more specific version is available for matching to a particular client device.

Continuing in block 260, the system publishes the advertisement framework including each of the defined advertisement units as a packaged entity designed to dynamically respond to multiple client device screens but be managed as a single entity by the author. Publishing the advertisement makes it available for display on websites or with other associated content, and engages the serving capability and client rendering capability of the system to dynamically select and modify advertisements based on the received versions and characteristics of any particular client device or spots or containers on a web page from which a request for an advertisement is received. After block 260, these steps conclude.

Figure 3:
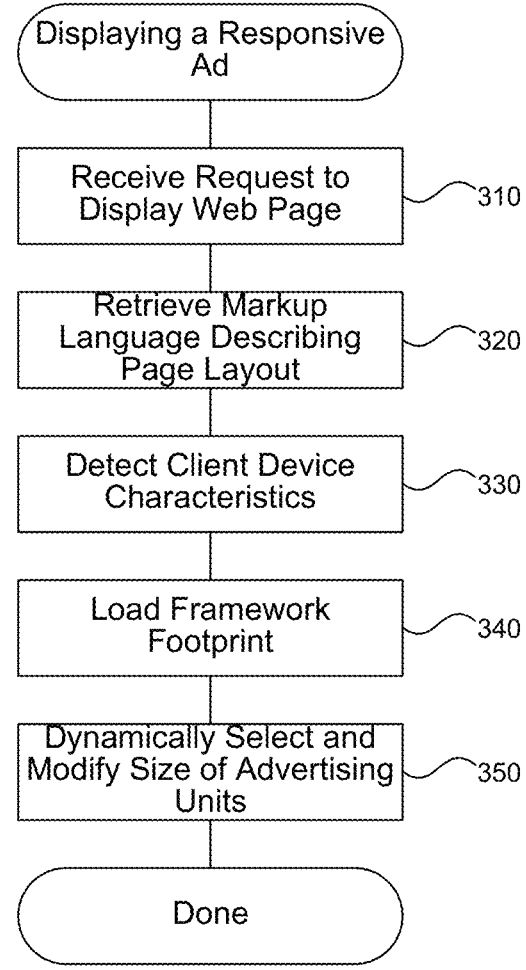
FIG. 3 is a flow diagram that illustrates processing of the responsive advertising system to deliver a web page with an embedded advertising framework of the type described herein that can dynamically select and insert adaptable advertising units when the web page is rendered on a client device, in one embodiment.

FIG. 3 is a flow diagram that illustrates processing of the responsive advertising system to deliver a web page with an embedded advertising framework of the type described herein that can dynamically select and insert adaptable advertising units when the web page is rendered on a client device, in one embodiment. Beginning in block 310, the system receives a request to display a web page. The request is generally produced when a user opens a web browser on a client device and navigates to a uniform resource locator (URL). For example, a user on a smartphone may click a link found on Facebook or in an email, which may cause the smartphone to open a browser application and navigate to the URL referenced by the link. Requests may also come from other sources, such as automated tools that open web pages and retrieve their content (e.g., RSS readers, web crawlers, and so forth).

Continuing in block 320, the system retrieves markup language describing a page layout of the requested web page from a web server, wherein the page layout includes one or more elements of non-advertising content, and a framework footprint containing advertising content associated with the web page. The web server may be a server that dynamically determines markup, such as a PHP server or a static web server. The server may dynamically insert the advertising framework or other content into the web page markup before the markup is delivered to the client device. The client then receives this markup and begins rendering the markup in a web browser. This typically occurs by the client device web browser hierarchically processing tags within the markup that describe the various content of the web page. The content may include one or more DIV or other tags that specify various divisions of content on the page, one or more of which may be places where advertisements can go on the web page. The page may include HTML, XML, CSS, and other formats of markup information, and the layout may include responsive web design information, such as media queries in CSS, that describe how the page layout will fluidly change under various conditions, such as varying client display sizes.

Continuing in block 330, the system detects one or more characteristics of a client device that will display the web page, wherein the characteristics include at least a size of an area in which the web page will be rendered. The characteristics may include the type of the client device (general, such as smartphone, laptop, or specific, such as the model number), the size of the client device screen or screens, the size of the browser application's window, and so forth. These characteristics may also change after the web page is first rendered, such as by the user resizing the browser application window, and the system may repeat these steps to adapt the content of the web page, including advertisements, to the available screen real estate.

Continuing in block 340, the system loads the retrieved framework footprint and identifies a plurality of possible advertising unit locations and layouts to render within or above the requested web page. The framework is a package data structure that allows multiple content items associated with an advertising campaign to be managed and published as a unit. In some embodiments, the framework may load only a small piece on the client, leaving other possible options of advertising units to be downloaded from the server. In other embodiments, the framework may download many advertising units to the client and select at the client which to turn on or off. Which method is chosen may depend on characteristics of the network connection between the client and server (e.g., optimizing to save bandwidth where bandwidth is scarce), characteristics of the processing power of the client device (e.g., conserving processing power on the client where that resource is scarce), or based on other characteristics.

Continuing in block 350, the system dynamically turns on or off and modifies a size for each possible advertising unit within the retrieved framework footprint to render within the requested web page based on the detected one or more characteristics of the client device and the available space within the web page. For any particular rendering of the advertising framework on a client device, the system may display one, none, or multiple actual advertisement units, depending on the detected client device characteristics. For example, on a client device having a large rectangular display area, the advertising framework may include multiple advertising units that are turned on and displayed in relatively large sizes in different positions within the web page. The same web page displayed on a smaller device, such a smartphone, may cause the advertising framework to select to turn on only a single relatively small advertising unit that fits better within the other content displayed on the smartphone screen. How all elements take a different position or x-y coordinate in the overall creative is a feature of the framework described herein In addition, while each element may be stored with relative position and sizing information in the framework footprint, the system may receive an absolute size at the time of display and set the size of each element of the responsive advertisement to fit into this available size. After block 350, these steps conclude.

Insertion Methods and Footprint Types

Another concept introduced by the responsive advertising system includes multiple insertion methods for getting marketing content from a defined package to the websites or other content areas where advertisements based on the marketing content are to be displayed. Insertion methods may differ based on the amount of control an advertiser has over a site's content. JavaScript and other techniques may also be used to dynamically determine conditions at a client device and adapt content from a marketing package to the conditions present on a particular device. For example, in some cases of high control, it may be possible to insert responsive advertising content directly into a site using a first party advertising tag. A footprint inserted as a first party tag may use JavaScript or other techniques to turn on and off potential advertisement slots on the page based on available size. With a first party tag these scripts may be directly included with the page. In other cases of less control, a responsive advertisement may be added to an existing system using a third party advertising tag. In this scenario the existing web page acts as a container, and HTML DIV tags or other techniques may be used to turn on or off (e.g., make visible or invisible) various third party advertisement tags at various locations on the page based on screen size or other conditions.

Figure 4:
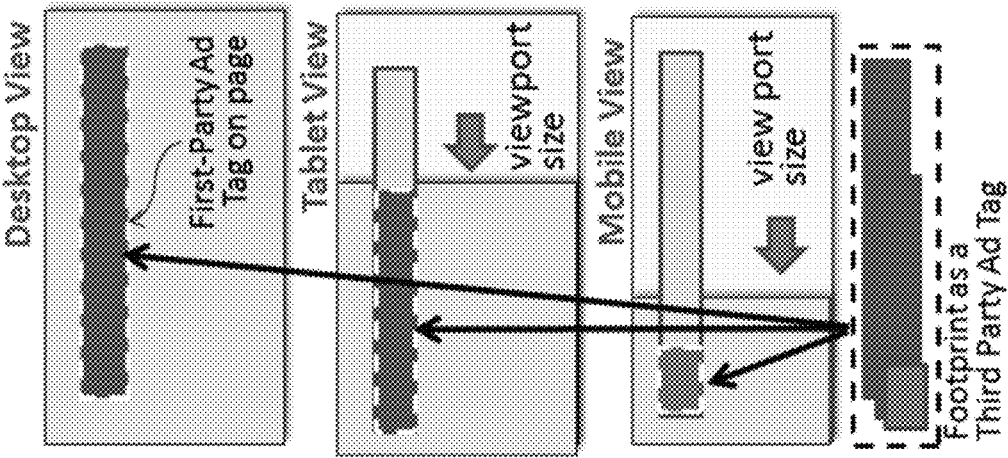
FIG. 4 is a block diagram showing three footprint examples.
Figure 4:
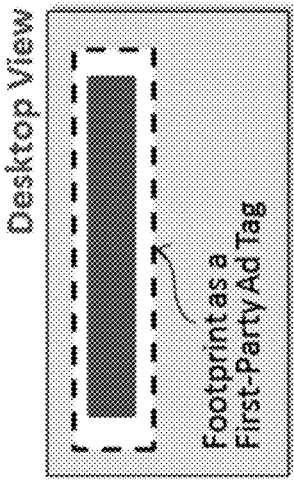
Figure 4:
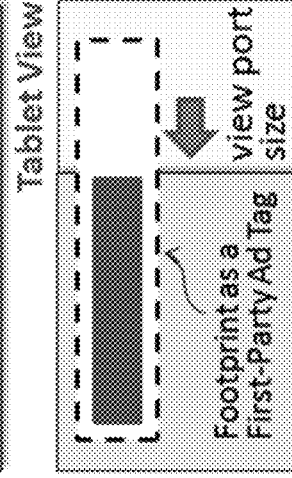
Figure 4:
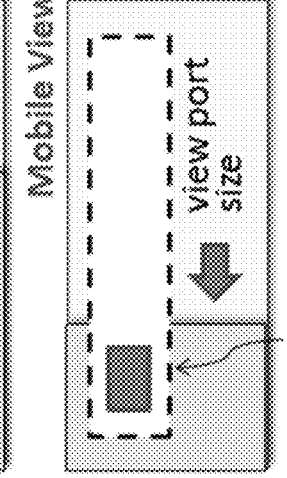
Figure 4:
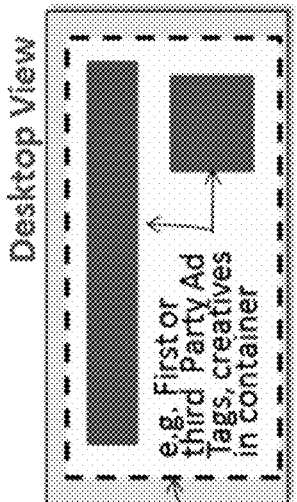
Figure 4:
Figure 4:
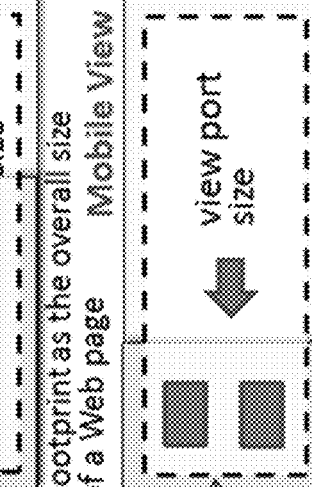

The responsive advertising system defines a footprint to encompass at least three different scenarios as shown in FIG. 4. In the case of a responsive web design site the system can render different fluid configurations for different screen resolutions based on what media queries (a feature of CSS3) call the viewport size. The system may also use other device detection methods in addition to viewport size to determine how to display responsive advertising content.

Type #1 410 applies when the overall footprint is the overall viewable area of the website. In this instance, the framework can provide advertisements that can be rendered across the entire site in the locations and sizes determined by the framework as described later in this document. When a footprint is installed in a site, and when the site changes based on the responsiveness of the site for different viewport sizes, the framework can turn on/off different first party tags, advertising creatives, and whatever is packaged in the framework as further described herein.

Type #2 420 applies when the footprint is treated as a first party advertising tag itself. A first party advertising tag is the terminology to describe code that is put in a specific area on a website that links to an advertising server that delivers advertisements into those first-party tags (commonly referred to as a publisher side advertising server). A footprint or footprint(s) in this case can be installed (inserted) onto a website in predefined positions where there is a desired location to serve ads. As the website changes form with the changes to the view port size or the responsiveness of the website, dictated by the framework configuration, different elements or components can be assigned (such as advertising tags, creatives, and so forth).

Type #3 430 applies when the footprint is actually the ad unit itself or in the case of being a third party tag that gets delivered into first party tags on the page. The framework can deliver the selected advertising tag or creative, that has been determined by the framework into this space.

Figure 5:
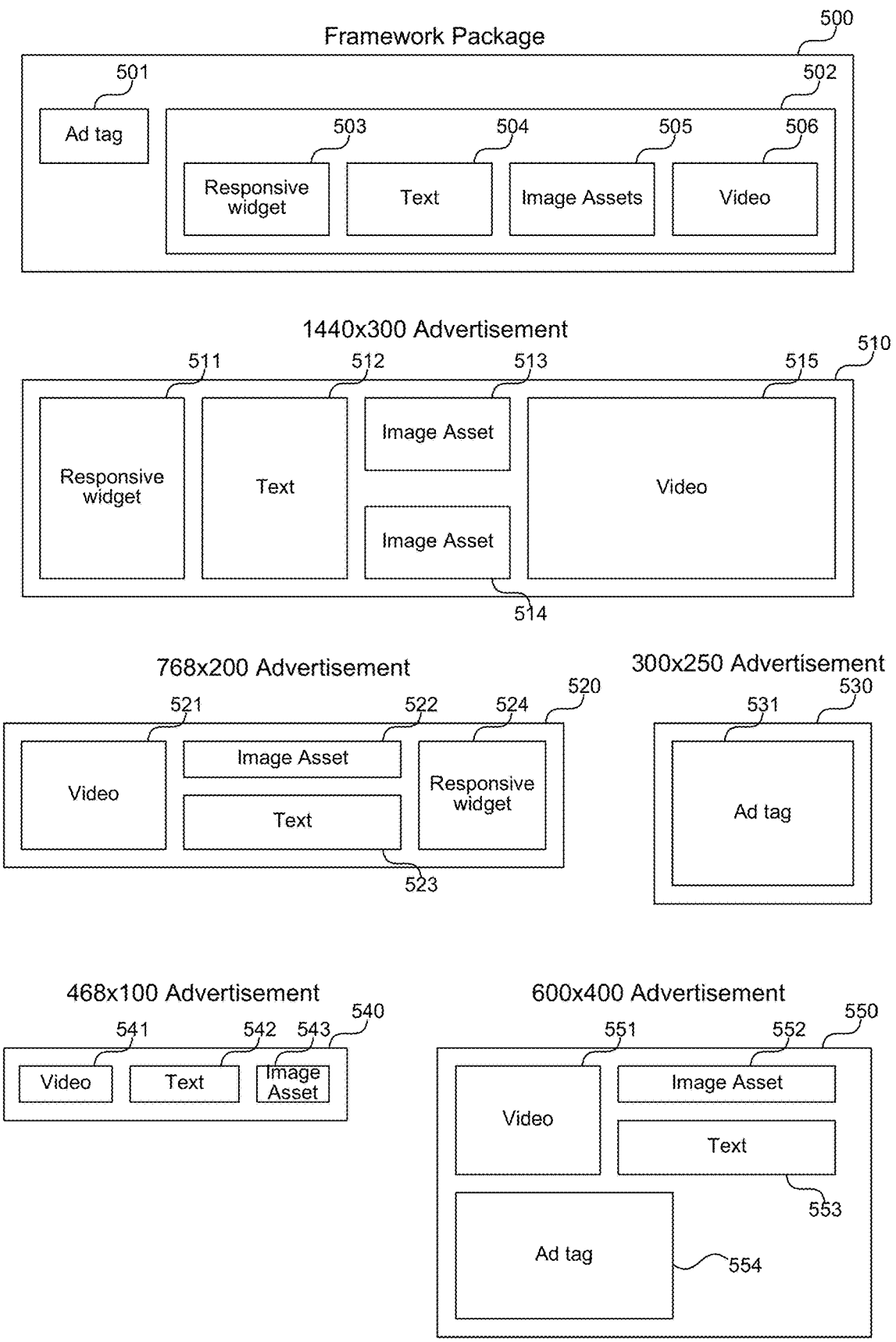
FIG. 5 is a display diagram that illustrates a dynamically resizing advertising framework in several size and placement scenarios, in one embodiment.

FIG. 5 is a display diagram that illustrates a dynamically resizing advertising framework in several size and placement scenarios, in one embodiment. The framework includes different elements, configurations, and positions in the overall advertisement and transitions from size to size in a dynamic way. Advertisements can be added to a size in this framework as well as combinations of assets. The framework package 500 stores each of the possible assets that can make up a placement of the advertisement as well as rules that define when each element is on or off, how each element is sized to fit the available placement area, and so forth. In this example, the package 500 includes an ad tag 501, a variable sized container 502, a responsive widget 503, text 504, image assets 505, and video 506. The image assets 505 may include one or more versions of the same image or one or more versions of different images that can be used in the advertisement under various conditions.

In the first placement 510, a 1440×300 advertisement is to be displayed in the available placement area. The advertisement in this instance will include a responsive widget 511 (which is a dynamically sized version of widget 503), text 512 (which is a dynamically sized version of text 504), image assets 513 and 514 (which are taken from the available image assets 505), and video 515 (which is a dynamically sized version of video 506). As the web page on which the advertising package is located is resized, the size of the placement area may change. In the second placement 520, a 768×200 advertisement is to be displayed in the available placement area. The advertisement in this instance will include video 521, image asset 522, text 523, and responsive 524. Note that in contrast to placement 510, the video and responsive widget have swapped sides and been resized. In addition, there is no longer room for the second image asset 514 to be displayed so no equivalent is shown in placement 520.

In the third placement 530, a 300×250 advertisement is to be displayed in the available placement area. In this example, the container 502 and its contents are not displayed. Rather, ad tag 531 makes up the entire content of placement 530. In the fourth placement 540, a 468×100 advertisement is to be displayed in the available placement area. The advertisement in this instance will include video 541, text 542, and image asset 543. In the fifth placement 550, a 600×400 advertisement is to be displayed in the available placement area. The advertisement in this instance will include both assets from container 502, as well as ad tag 554. The advertisement includes video 551, image asset 552, text 553, and ad tag 554.

Note that in this diagram, text 504, text 512, text 523, text 542, and text 553 may all be the same. In other words, these regions of the advertisement placement may all contain the same text, but the text may be fit to a different sized and positioned rectangle, wrapped around images, or laid out in some other different manner in each placement. Alternatively or additionally, a user of the system when creating the framework package may specify various text assets that apply in different situations. For example, the user may specify a short description that is displayed for smaller sized placements, and a longer description that is displayed for larger sized placements. Similarly, other asset types, such as the widgets, video, and images may be the same in each of the advertisement placements shown, or they may be selected from a set of assets having a range of likely to be used sizes. In addition, the x-y coordinate positioning and size (e.g., width and height) of each of the displayed regions may vary from placement to placement in order to most effectively fill the available space and avoid empty regions of whitespace.

Figure 6:
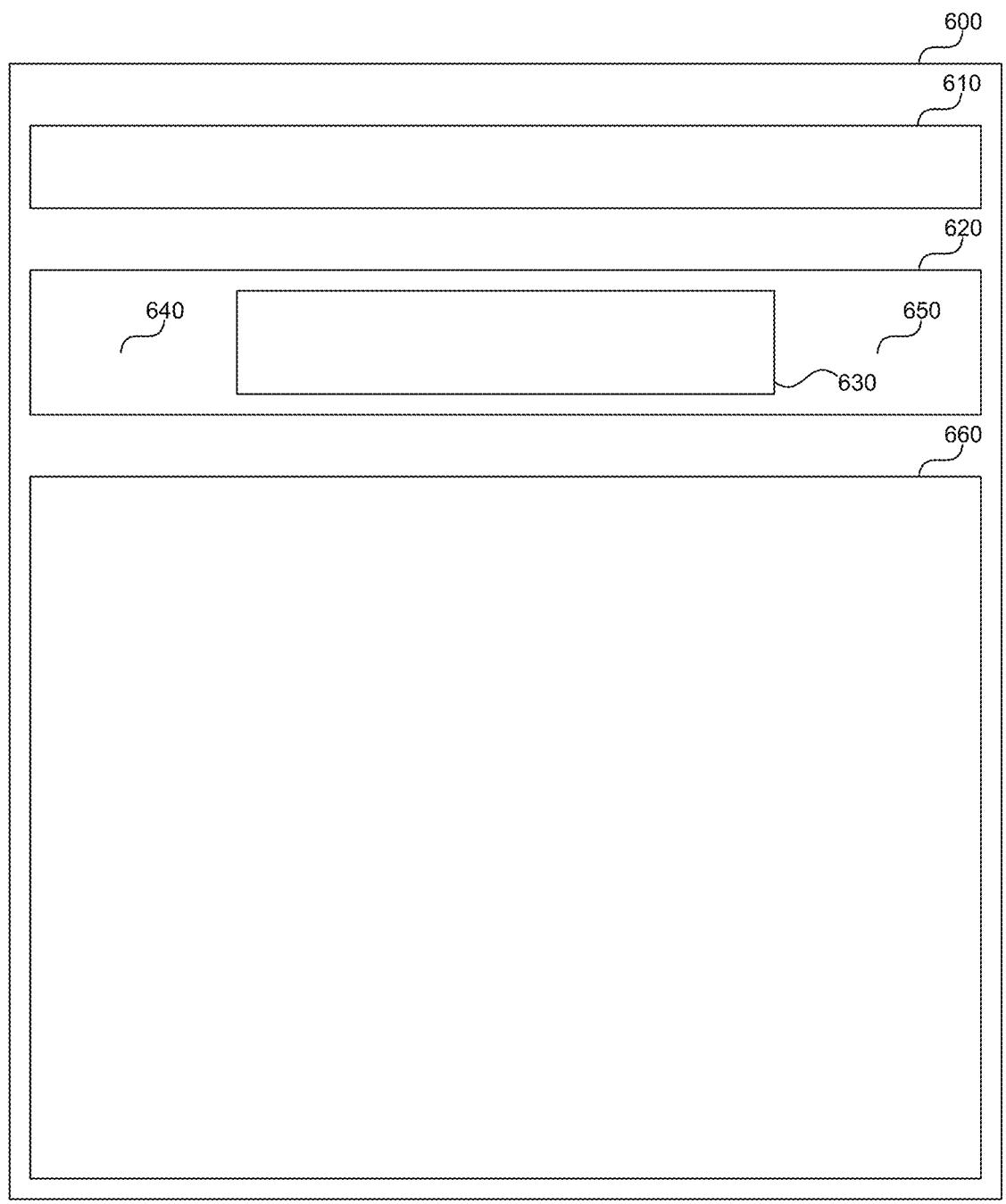
FIG. 6 is a block diagram that illustrates a website that is not using responsive advertisements.

FIG. 6 is a block diagram that illustrates a website that is not using responsive advertisements. A web browser window 600 includes top web content 610, such as a menu bar, a banner advertisement area 620, and main page content 660. The top web content 610 and main page content 660 may include many types of content, and may even be laid out according to responsive web design techniques. The banner advertisement area 620 provides a placement area for an advertisement that is the full width of the browser window 600 (minus potential margins for reasonable spacing) and is near the top of the page for prominent engagement of target consumers. However, in the illustrated example, a banner advertisement image 630 is provided in a traditional, non-responsive format that leaves substantial unused left whitespace 640 and right whitespace 650. This is inefficient, detracts from the clean layout of the rest of the page, and may fail to be effective at engaging the consumer. The responsive advertisements described herein and laid out by the system described herein, would better utilize the available space by adapting the assets, size of assets, placement of assets, and so forth used in the available banner advertisement area 620.

The system described herein can also work with non-responsive sites, with the solution described herein deployed in each of the different channels. Therefore, even though one approach for the responsive advertising system might be for a responsive site as it would be very efficient, other approaches can be applied with the system as well. As multi-screen content delivery has been a hot topic for publishers and advertisers to have a flexible solution to meet the needs of the different screen formats of the marketplace today, alignment with the growth of social media and mobile has been highly relevant to be able to extend existing advertising strategies from desktop to tablet and mobile.

Any mention of third party brands herein, such as Salesforce, may include trademarks and associated copyrights by their respective owners. All advertising examples are only examples to show the capabilities of the system and should not be assumed or construed to indicate that there is a business relationship with the advertiser.

The following terms are used throughout this document.

Third party tags. Advertiser ad tags that hold the ad creative. The tags respond to different ad unit sizes and shapes by changing either to swap ad or stretch ad configurations to effectively fit that space.

First party tags. Ad unit tags that are generated by typical ad servers such as Dart for Publishers (DFP). These tags go into a site to the positions (ad slots) where ads are served.

Ad footprint. This is the shape of the ad in any given scenario for screen size. Ad footprints can be set-up based on the ad slot configurations. Footprints can be fixed, proportional aspect ratio, and so forth.

Ad slot. A place on the responsive web site HTML where publishers insert a 1st party tags (e.g., inside of a leaderboard wrapper <div> HTML tag).

Creative. An ad unit that can be Flash, image file (GIF, JPEG, PNG), HTML5 code, or other.

Flow line. The way a footprint changes shape or the way the ad changes shape and size in a responsive layout. There are different ways to describe Flow lines, such as Linear, Accordion, Custom (there are proprietary responsive ad formats created by author) as well as methods to describe how an ad will act based on media queries and responsive web design. The Flow line will also contain story-line communications for different delivery scenario's as well as context directed at end-users or segments. Related products are sometimes delivered under the FLOW-LINE™ trademark.

Media queries. The standard in responsive web design for breakpoints of the different forms of the user interface of the web site from desktop, tablet, or mobile.

Stretch ad. This ad footprint is fluid, liquid and can change size with one ad creative HTML asset. Depending on the flow line, an ad footprint can take any form. Related products are sometimes delivered under the STRETCH™ trademark.

Swap ad. This ad footprint has different creatives that change depending on the different break points of media queries in responsive web design. Related products are sometimes delivered under the SWAP™ trademark.

Story line. This is the transitional experience of a user as they engage an ad from one screen to the next. Attribution models can be built from this storyline experience. Related products are sometimes delivered under the STORY LINE™ trademark.

Package Format for Unified Management

One concept introduced by the responsive advertising system is that of a package for backend storage sufficient to contain particular marketing creative content independent of the view types, footprints, and devices on which the content will be delivered and displayed. If an advertiser has a campaign to advertise a particular new product, then the package will reflect the theme of that campaign, and will describe all of the many formats in which that theme can be expressed. For example, if the campaign includes a logo, a tagline, some descriptive content, and a link for more information, the package may describe how each of these elements will be laid out when the space available is very tall and thin (e.g., 160×600, as in a desktop column), very wide and short (e.g., 468×60j, as in a tablet banner space), and both thin and short (e.g., 300×50, as in a smartphone banner space). This concept alone alleviates a major headache of advertisers, which is the disparate management of marketing creative content. With the responsive advertising system, all of the management is performed in one place, and differences or ways of adapting to the differences of viewports and devices can be explicitly and concisely described. Changes to the marketing creative content over time (e.g., edits) can be reflected on all possible platforms with management in a single place, eliminating the possibility of an outdated marketing message on some platforms or in some circumstances.

Advertisement Unit Types

Another concept introduced by the responsive advertising system is a set of new advertisement types that allow for adapting the previously described package to a set of view characteristics present on any particular client device. The advertisement types described herein allow a single set of marketing creative content to be adapted to display at different locations, sizes, and layouts based on view characteristics in which the content is displayed. For example, a single set of content may display in one view as a skyscraper type advertisement in the right column, in another view as a rectangular banner across the top of content, and in another view as an adhesion banner that "sticks" to the bottom edge of a tablet display. Not only is the positioning of the advertising content changing in each of these examples, but also the sizing and layout of the advertising content may change. For example, a logo may be prominently displayed at the top of a skyscraper advertisement, and may move to the left edge of an adhesion banner. Similarly, widths, heights, and other characteristics of the marketing content can adapt in these advertisement types to display in the most suitable manner for a particular view type.

Stretch is an advertisement concept described herein that refers to a unique HTML responsive ad unit technology of the responsive advertising system. Stretch ads have flow lines to determine the particular shape of a stretch advertisement from screen to screen. Some example types of stretch advertisement flow lines described further herein are linear, accordion, toppler, adhesion snap, and backdrop.

A linear responsive ad format can start from Billboard (970×250), Super Leaderboard (970×90) or Leaderboard (728×90) and go to smaller horizontal banner sizes like IAB Banner (468×60) in tablet and finally down to mobile banner sizes (320×50, 300×50, 216×39). This ad unit can be set to utilize extra horizontal space with interstitial sizes going smaller proportionally from the last larger standard size. An accordion responsive ad format may remains at 300px width and swap to vertically smaller sizes. Desktop size can start from Medium Rectangle (300×250), Half-page (300×600), or IAB Portrait (300×1050) and go smaller to Button (300×150) or 3:1 (300×100) in tablets and to 300×50 in mobile. The ad unit can be set to always remain at 300px width or enable it to shrink proportionally if used in a fluid grid layout with flexible columns. A toppler responsive ad format is a vertical ad in desktop and then topples down to a horizontal ad in tablet or mobile. Desktop (and tablet) size can be a half-page (300×600), IAB portrait (300×1050) or a wide skyscraper (160×600) that changes in to horizontal banner (728×90, 468×60, 320×50, 300×50) at a customizable screen width breakpoint. Horizontal ad sizes can be set to utilize extra horizontal space with interstitial sizes going smaller proportionally from the last larger standard size.

An adhesion snap responsive ad format can be any ad unit size in desktop (and tablet landscape), e.g., half-page (300×600), medium rectangle (300×250), or wide skyscraper (160×600), which then changes into an adhesion banner in tablet (screen width×90) and mobile (screen width×50). The adhesion banner sticks to the bottom of the screen and always stays visible. A backdrop responsive ad format may be used for premium advertisers. Served as a single ad tag, backdrop provides a premium above-the-fold ad format across all screens. For desktop and mobile landscape screens, the ad format is shown as a "wallpaper skin". For tablet and mobile portrait screens the ad format changes into an adhesion banner that sticks to the top or bottom of the website.

Client Experiences

Each of the previously described concepts leads to a great client experience that may be largely transparent to the end user. A user accessing a website with a smartphone may simply note that he or she is able to access the website and that there are advertisements within the content of the website that are well placed (e.g., in line with the content, or unobtrusively above or below the content). The same or a different user may access the website on a tablet device, and may or may not notice that the content is in a suitable format for that device, and the advertisements, while still present, have moved to more suitable positions for that device (e.g., larger banners above and below the content, or in a separate column). A user resizing a browser window on a desktop may notice that the elements of the web page, including advertisements, relocate and resize in a sensible manner. The system delivers a client experience on any device and in any viewport size that provides the impressions desired by advertisers without the end user necessarily being aware of the complex processing behind the scenes to provide the user with a device-appropriate viewing experience.

Adaptive Sizing

As described above, the responsive advertising system provides adaptive sizing of an advertisement footprint depending on browser characteristics of a viewing client. For a given website, a publisher will allocate positions based on fixed sizes for advertisement units. This has been the standard process since website advertisements were first created. Industry associations such as the Interactive Advertising Bureau (IAB) since 2002 and others have created standards around these different types of units in fixed form for positioning into a fixed website grid. The IAB has published since 2002 four predominant ad unit sizes as part of their Universal Ad Package (UAP) standard. The discussion herein focuses on three main example shapes: banner, tower, and rectangle. There are many other shapes and sizes as these formats have evolved as a standard or remained custom depending on the publisher and their relationship with advertising networks, agencies, or buyers of the advertising inventory on the site. The publisher has been known to sell media for those fixed positions on the website.

Examples of common banner, tower, and rectangle formats are as follows. A Banner (Leaderboard) is typically 780×90 IMU (IMU is an IAB term related to pixels), a Rectangle (medium or small) is 300×250 IMU or 180×250 IMU, and a Tower (skyscraper) is 160×600 IMU. These sizes are now what the industry has been using and they are sizes that are only targeting online (website) display or performance-based advertising. There are many formats as well around rich media and video advertising units, but for the sake of simplicity, the discussion herein focuses on display advertising. Those of ordinary skill in the art will recognize the applicability of the concepts described herein to other advertising formats and placements.

As mobile emerged as a scenario for viewing web content, the same process then evolved totally disconnected from the online world. This was based on mobile screen sizes and suitable formats for those sizes. An entire cottage industry of mobile advertising networks and mobile platforms has evolved around these standards that are totally different and not connected to the online world. Some example advertisement unit footprints are an X-Large Image Banner of typical size 320×50 or 300×75 pixels, a Large Image Banner sized 216×36 to 54 pixels, a Medium Image Banner size 168×28 to 42 pixels, and a Small Image size 120×20 to 30 pixels. As the online advertising industry evolved with expandable and new types of advertising technologies around these footprints, so has mobile. However, these two different channels, mobile and online, have been very separate channels. The responsive advertising system merges these two different platforms.

Cross-Media Display Format

The responsive advertising system provides a footprint framework that accepts advertising units and links to different sizes and advertising units to fit into the available footprint. Technically speaking this framework is an adaptive grid that links back to a dashboard that can be used to design the different sizes suitable for different screens based on characteristics such as a browser width or device type. The footprints of the three different online standard forms can have different sizes based on the different browser widths. In a responsive or adaptive web design, example browser widths are as follows: Smartphone—320px, Tablet—768px, Netbook—1024px, and Desktop—1600px.

Depending on each of these different browser widths or device types, the footprint can change to be able to handle responsiveness to let the advertising network know the positioning is now different for a different advertisement fill type or different ad-tag or ad-technology. The footprint can also automatically change the graphic of the advertisement to match the new size requirements. Finally, the footprint can deliver valuable information about the context, browser, and device type for that web page.

The responsive advertising system does this in part by either automatically or with a dashboard for an administrator managing any of these new footprint sizes for these different unit types. The system provides a control panel for advertisement publishers with different footprints linked to a control panel where advertisement publishers can determine what size they want for that footprint to accept advertisement sizes.

Technology Framework

The responsive advertising system provides a technology framework that includes an integrated mechanism for ad-tags, applications, ad unit creative, and advertising technology responsive delivery. There are a few ways to recognize a browser/device width using various techniques that are well known in the art. What makes the adaptive footprint herein useful is that it is a widget to house all kinds of technologies and services of the user. It is the physical digital foundation for their advertising fulfillment. If users have been previously working with different advertising networks or platforms, they can just add those ad-tags, creatives to the responsive advertising footprint.

In some embodiments, the system uses JavaScript to access the window.innerHeight property of a web page displayed in a browser, the first party tag, ad slot defined area, or third party tag. Using this property web page logic can know what is the width (in pixels) of the browser (mobile or PC) that is viewing the advertisement and display a proper advertising unit. Those of ordinary skill in the art will recognize other ways to determine advertising units based on browser width or any other recognizable property that helps determine the browser source and type (e.g., determine if the device is a PC and what the PC screen width is, determine if the device is a mobile device and if so which kind, and so forth).

The process of determining device characteristics can be performed on the server or client side. For example, the server can run the mechanism to determine the browser source and type and display the correct advertising unit (e.g., via user-agent or other properties provided to the server by the client). As another example, the client can perform the mechanism to determine the browser source and type (e.g., via browser, native application, or other).

In some embodiments, the system provides a backbone server (e.g., PHP) that identifies the user that is displaying the advertisement and then display the fitted advertisement to the user. In some embodiments, identifying the user includes determining whether the user is a returning user to the system and what device the advertisement is being rendered for now (e.g., a PC, a mobile phone, a tablet, and so on). If the user is a new user to the system, the system may save the user (e.g., any available data, such as Facebook data for better recognition of the user in the future), understand what device the user is using, and then determining which format to render and display for the advertisement.

Along with the backbone, the system can provide a code to the site owner to put on his website. This code communicates with the backbone for identification and then provides any modification to the browser rendering the advertisement. The browser may initiate a call to the backbone with any change in display format and the backbone will respond with an appropriate advertisement.

In some embodiments, the backbone is fully integrated with known ad-server and ad-networks and gets advertisement creative assets (e.g., graphics, rich-media, and so forth) from there. The administrator receives full analytics about the users and devices to which the advertisement was rendered. The analytics data may contain information such as click-through rate (CTR), effective cost per thousand impressions (eCPM), and cost per click (CPC).

PHP and other server-side languages can easily determine the source from a user agent property provided by the browser. The user agent is typically a string that describes information such as browser type, browser version, frameworks installed, Internet Protocol (IP) address (geo identifying the user and resolving the address to understand what group the user is related to), the browser width (depending on the resolution of the browser the system may infer what type of device is being used). With all of these properties and other parameters that can be retrieved, the server can accurately identify the user.

As described herein, the responsive advertising system provides a number of advancements over the current state of the art. The system provides automatic size detection to indicate what advertising unit size should go into an available footprint area of a web page or target client. The system also uses ad-tag intelligent selection and provides an adaptive advertisement. In some embodiments, the system stores profiles or targeting parameters for retargeting, clicks on the ad, as well as cross-media alignment.

Ad Formats

With the growth of smartphones, tablet devices, and digital signage that have compatible browsers to desktop computers, an array of devices with screen sizes that span from 2" all the way up to 50-92" (e.g., in the case of browser-based Web TVs) is now a reality. As a user, having to create different assets for these different screen sizes and contexts can be quite a heavy and costly process. In order to streamline this process, having ad units that conform or fit to different standards and sizes or just a designated random sized ad spot on the page can be a very strong opportunity to not only make the process simpler, but also to offer correlation analytics for each different scenario in one unit. The ad spot on the page can be dynamic, and the framework will fit into it. Alternatively, the framework may define the ad slot shape. The ad operations process is quite task heavy and costly when it comes to having multiple creatives and needs to be configured to different third party ad tags for delivery. In some embodiments, the responsive advertisement system provides three different response mechanisms (sometimes referred to as "Triple Response") as they come together to create relevant advertisements across multiple screens based on a flow line in a story-line form (cross-screen).

The three types of responsive elements applied by the responsive advertising system are: 1) ads that respond to device assets or content objects, 2) ads that respond to situation or context, and 3) ads that respond to the user. The responsive advertising system applies these three different areas together into a method of configuring an ad to dynamically change in real time.

Ads that respond to device assets or content objects relate to making the ad unit ubiquitous for any screen or media object. For example, based on input specifying information from the devices themselves, the system may provide a shape (size) of the ad footprint that is possible. The ad itself changes shape to respond to screen size. There are two ways to do this provided by the responsive advertisement system. One way is to use swap ads (which is a package of specific advertising creatives that each are delivered to the relevant size of the screen or object) and the other is to use stretch ads (that is an actual one creative that that changes size and shape when viewed from different screens or objects).

One way to look at this is with the different IAB (Interactive Advertising Bureau) standards for different screen sizes (e.g., desktop; 728×90px, tablet; 468×60, mobile; 300×50). If the ad changes shape to conform with these different standards for different views automatically this would be an example of this approach. The different areas that determine how an ad can respond are as follows: screen size or pixel width that determine break points, the actual reference to the device itself (this is a subset of the pixel width), and the actual technology or web application (such as the ad fitting into a video player, into an application, and so on).

The second type of responsive element applied by the responsive advertising system includes ads that respond to situation or context. This relates to the way the ad unit behaves based on the situation or context. For example, the system may receive as input information about the outside surroundings or the places, time circumstances for the user to engage in the site, and provide as output the actual design of the ad itself. This may mean that depending on the contextual circumstances, the ad could change color, design, or overall contents. Each circumstance is separated and each design for each ad for screen size would be independent of each other. The way the ad works mechanically from screen to screen may also vary (e.g., touch vs. click).

The third type of responsive element applied by the responsive advertising system includes ads that respond to the user. This relates to the way the ad interacts with the user with conversational dialog and copywriting of the ad. For example, the system may receive as input an identification of who is the user or segment and provide as output text or language in the ad based on what the user has done, experienced the ad campaign before, the point in the purchase process and the social community around him/her. The actual text content changes from screen to screen to best accompany the best response for the user. If the user sees the ad (brand marketing) on one screen, the ad can then move to a direct responsive ad (intent based text copy) on another screen or mobile screen.

Stretch Ads

The following paragraphs further described stretch ads. Stretch ads refer to the ability for ads to morph elastically and change based on screen, context, and user. Based on a dashboard or configuration manager, the ad is created and hosted as a flexible ad unit. In some embodiments, there is only one ad built in HTML5 with a foot print and its contents can dynamically change with the elements of the content being streamed and served (separately from an ad server that delivers the ad tag) from a host in the cloud. Any of the different elements of the ad, such as the colors, the images, the text, the animation, the integrated application-programming interfaces (API's) can all be delivered dynamically into any form deemed relevant by the controlling dashboard automatically or via the marketer operating the control panel themselves.

The responsive advertising system applies a concept called flow lines. Previously, there have been a lot of technologies and solutions surrounding specific channels such as mobile, online, or tablet alone. However, the technology to making advertising more relevant as a summation is the concept of a single advertisement that can act as a story line for the systematic transition of a user from one screen to the next. Today, with the concept of screen shifting, a user will access one screen (e.g., a desktop computer) during a certain time of the day, and then access other screens such as mobile when on the go. Having a technique to allow for one ad delivered for a specific campaign to change dynamically based on the triple response described above can be very powerful for better engagement and actions with users.

Although the stretch ads configuration described above provides one way to solve the one-ad-fits-all dynamic configuration based on the flow line concept, the system may not be limited to this approach only. For example, the system also provides a concept of swap advertisements as well. Even the issue of a flow line acting like a form of playlist of advertisement configurations on page that can become a complete flow of multiple ads per page.

Flow Lines

The flow line concept provides a number of improvements over previous technology. Flow lines provide a process that works with any different type of creative for multi-screen advertising (e.g., stretch, swap, or a combination). Flow lines provide an ability to create a first party or third party ad tag that works everywhere on all screens, significantly taking away the complexity of the Ad Ops multi-screen process. Flow lines provide real-time dynamic configuration of the ad creative without having to change the ad tag. This gives the marketer the ability to best enhance or make the ad creative best suited for the campaign. Flow lines provide a simple way to create a story line for the end-user journal of content or advertising experience. Flow lines create a method for enabling a complete package or sponsorship of a particular inventory spot that exists across all screens. Flow lines provide a flexible way to configure legacy ad creatives (such as Flash for desktop and HTML for mobile) as one campaign. This can be achieved with the swap configuration, for example. Flow lines have the ability of a complete multi-screen analytics and reporting process that brings everything together around a specific campaign. Flow lines are complementary to any existing ad server or Ad Operations (Ad Ops) process today. Flow lines assure the highest quality of each different visualization of ad from screen to screen. Flow lines provide ads that can work in any screen position (e.g., landscape vs. portrait mode). Flow lines provide an ability for creating ads that best position on a website. For instance, if several ads are sold to be above the fold on desktop, it allows both the publisher and the advertiser to have those ads maintain that inventory/sales strategy to be in a proper shape and form above the fold even on mobile screens.

The following paragraphs describe different techniques and concepts related to flow lines. A flow line is based on dynamically changing the shape of the advertisements, and the ability for the ads themselves to morph or change sizes based on a configuration of the flow line that can map to the target location or area. The flow line gives a way of setting what the shapes will be for a specific responsive web design site at different break points that determine where the site changes shape based on the different widths of the screen or object. These flow lines can be in configured on the actual site itself and then the ad that is served fits into the flow-line embedded into the site. The other method is to have the flow line itself incorporated into the ad and the ad tag. This enables the ad to fit to the designated site in the configuration originally set for the ad itself.

The content of flow line based advertisements can be based on context. The previous paragraphs described the ability for the ads themselves to morph or change sizes based on a concept of flow lines. For a specific responsive web design site there are break points that determine where the site changes shape based on the different widths of the screen or object. However, the responsive advertising system can also look to configure the flow line on not only breakpoints or screen or object shape, but on external input modifiers, such as temperature, time of day, location of user, behavioral circumstances, and so forth. In other words, a storyline of the presentation of the ad from screen to screen can be set based on the context.

Flow lines can also be used to target advertising content to a particular user or user information. Given the fact that the system can modify the content in an ad itself and configure it based on a flow line, the system can now make it so that the actual content in the ad can be relevant for the user. This could mean specific information from social circles or the way the user interacts with the ad itself. Much of this is also very sensitive based on privacy, but that is something that is handled separately in the identification and targeting of a specific user. What the flow line enables is the possibility to have direct conversations with the user based on how that advertiser would like to have a story for that particular user. One example is the flow line for a specific user based on the purchase process.

How data is aggregated about the user, or the segment of the user based on activity and behavior, is a separate interface and technology that will be discussed later. The technology around the actual ad and how it can be presented in a form dynamically on the fly without changing ad server tags or the overall campaign is the job of the flow line.

The following paragraphs describe the flexibility of flow line set up for paid, earned, and owned media. The above example had this set-up for a specific ad example (Sales force) for an ad campaign. However, setting up flow lines is not limited to just this. For example, a user could use the technology for house-ads on a site with the technology linked to the overall customer relationship management (CRM) system of the user. The different configurations could be set-up across all of the different content pages for a user linking to a customer. There are also different types of media such as paid (e.g., use media dollars to acquire users), earned (e.g., gain users via blogs or social media), and owned (e.g., marketing to users that are already customers).

The same process could be used for marketing messages on the user's website, blog pages, emails linking the actual house ad related to every touch point of that publisher. In the paid scenario, the user acts like an advertiser and the ad is very similar to the first four steps of the purchase process described above. The earned scenario could be for a user using their own media and blogs and house ads to start the engagement process with that customer for these four steps as well. Owned media could be marketing messages that exist from the fourth to seventh steps.

By having a single ad that can do this no matter the device or the place the ad-tag is placed to serve the ad, the responsive advertising system provides a very powerful solution to easily get a holistic view of the overall marketing to the users and customers of a publisher or brand.

The following describes flow line mixes (stretch and swap ad configurations, multiple flow lines, or composite configurations). The responsive advertising system is not just limited to stretch banner ads. A basic version of silo ads for each different screen or campaign has been typically image ads, flash, or HTML5 files. Packaging these files together to deliver for a specific screen, context, or campaign is a traditional way of doing it. Having the stretch technology as a foundation can also provide the ability to use the same tag to deliver these different creatives depending on the configuration of a flow line. Depending on the settings for the triple responsive, the flow line configuration can call these total assets instead of calling individual pieces of the ad to be put together as the ad itself.

Authoring Tools

Another concept introduced by the responsive advertising system is an authoring environment and tools for creating the previously described package. The responsive advertising system provides a powerful platform through which advertisers can publish creative advertisements with various responsive components. The system is powerful enough that advertisements created through the system are applications unto themselves. These can be HTML5 elements, image elements, ADOBE™ FLASH™ elements, or other types of applications incorporated in the advertisement and may be embedded in websites or other locations where advertisements are published.

The responsive advertising system provides an authoring tool through which advertisers can specify various layouts and content for a single advertising unit, as well as conditions and criteria under which the advertisement content will change. For example, the advertiser might specify how a particular advertisement will look on a desktop computer, on a laptop, on a smartphone, on a tablet, on a smart watch, or other screen type as well as elements of the advertisement that may change to respond to changing events and conditions, such as the user's viewability (sequencing), location, previous actions, time of day, store promotions, or other criteria relevant to the advertiser. Thus, the responsive advertising system provides an advertisement authoring and serving platform that allows for the creation of a new type of highly responsive advertisement that changes over time and across devices to tell a cohesive story and does so in a unified advertising unit format that does not ask advertisers to manage numerous advertising campaigns.

When creating a stretch ad or stretch ad combo with swap with a flow line being configured, there are various ways for content and data to be integrated with the actual ad itself. One example is a "Responsive Ad Creator and Dashboard" that can be provided by the system. A Responsive Ad Creator (Ad Configurator) component is one product and technology that has been developed specifically for creating an ad with a flow line. Files can be uploaded from an existing desktop ad. Then, the ad is transformed into a cloud-hosted HTML5 ad. The flow line is built using standard flow lines mentioned above or a custom flow line. This process is described in detail through figures in the related application incorporated above.

CONCLUSION

From the foregoing, it will be appreciated that specific embodiments of the system have been described herein for purposes of illustration, but that various modifications may be made without deviating from the spirit and scope of the invention. Accordingly, the invention is not limited except as by the appended claims.

I claim:
1. A computer-implemented method, comprising:
receiving, via a server, a request from a client device to display a web page within a viewport of an application running on the client device, wherein the web page has a layout including a non-advertising content and a framework footprint, wherein the layout is described by a markup language, wherein the viewport has a characteristic;
retrieving, via the server, responsive to the request, the markup language;
retrieving, via the server, responsive to the request, an advertising content associated with the web page for rendering within the framework footprint when the non-advertising content and the framework footprint are simultaneously presented within the viewport responsive to the request, wherein the advertising content includes a plurality of advertising units of a plurality of content types that are different from each other;
loading, via the server, responsive to the request, the markup language to the client device such that, the framework footprint (a) runs on the client device, (b) detects the characteristic, (c) identifies (i) a plurality of possible locations within the viewport suitable for presenting the advertising units of the content types that are different from each other and based on the characteristic and (ii) the advertising units of the content types that are different from each other to selectively include within the framework footprint based on the characteristic for presenting within the possible locations, and (d) dynamically resize or dynamically reshape the framework footprint presented within the viewport based on the characteristic while the non-advertising content is presented within the viewport such that at least one of the advertising units within the framework footprint is dynamically resized or dynamically reshaped within the framework footprint while the non-advertising content is presented.

2. The method of claim 1, wherein retrieving the markup language describing the page layout comprises retrieving a cascading stylesheet (CSS) that includes a media query that defines a breakpoint for resizing the web page, including the advertising content within the framework footprint.

3. The method of claim 1, wherein the framework footprint includes information for dynamically resizing or dynamically reshaping the framework footprint or the advertising units within the framework footprint.

4. The method of claim 1, wherein the framework footprint detects the characteristic based on detecting a proportionally sized region within the viewport into the advertising units will be populated.

5. The method of claim 1, wherein the framework footprint detects the characteristic based on detecting at least one of a type of the client device, a size of a screen of the client device, a shape of the screen of the client device, or a size of the viewport.

6. The method of claim 1, wherein the framework footprint detects the characteristic based on re-detecting the characteristic in direct response to a user initiated change in a size of the application presented within the viewport or the viewport, and dynamically resizing or dynamically reshaping a visible advertising unit of the advertising units within the framework footprint while the framework footprint is simultaneously presented with the non-advertising content within the viewport.

7. The method of claim 1, wherein loading the markup language comprises parsing a package data structure that allows multiple content items associated with an advertising campaign to be managed and published as the advertising units.

8. The method of claim 1, wherein loading the markup language comprises loading only a portion of the advertising units within the viewport, and leaving other of the advertising units to be progressively downloaded by the client device from the server only if needed based on the characteristic as detected by the framework footprint while running on the client device.

9. The method of claim 1, wherein loading the markup language comprises loading the advertising units associated with the framework footprint at the client device and selecting at the client device which of the advertising units to change in size or shape based on the characteristic as detected by the framework footprint while running on the client device.

10. The method of claim 1, wherein dynamically resizing comprises integrating the framework footprint dynamically within the web page using a responsive web design to dynamically vary a size of the non-advertising content.

11. The method of claim 1, wherein each of the advertising units in the framework footprint is stored with relative position and sizing information thereof, and further comprising causing, by the server, a receipt of an absolute size for each of the advertising units when displayed within the viewport, and causing, by the server, a setting of the size of each of the advertising units to fit into the absolute size as respectfully available.

12. The method of claim 1, wherein the client device is at least one of a smartphone or a tablet.

13. The method of claim 1, wherein the application is a browser running on the client device.

14. The method of claim 1, wherein the application is an RSS reader running on the client device.

15. The method of claim 1, wherein the server is programmed to dynamically determine the markup language.

16. The method of claim 1, wherein the characteristic includes a type of the client device.

17. The method of claim 1, wherein the characteristic includes a screen size of the client device.

18. The method of claim 1, wherein the characteristic includes a size of the viewport.

19. The method of claim 1, wherein the characteristic is dynamic based on resizing the viewport.

20. The method of claim 1, wherein the framework footprint is programmed to load only a portion of an advertising unit of the advertising unit on the client device while leaving other possible options of the advertising units to be subsequently downloaded from the server.

21. The method of claim 1, further comprising loading, via the server, responsive to the request, the markup language to the client device such that there is a rearranging of the advertising units within the framework footprint presented within the viewport while the framework footprint is simultaneously presented with the non-advertising content within the viewport responsive to a dynamic resizing the framework footprint within the viewport.

22. The method of claim 1, further comprising loading, via the server, responsive to the request, the markup language to the client device such that there is a dynamic reshaping of the advertising units within the framework footprint presented within the viewport while the framework footprint is simultaneously presented with the non-advertising content within the viewport responsive to a dynamic resizing of the framework footprint within the viewport.

23. The method of claim 1, further comprising loading, via the server, responsive to the request, the markup language to the client device such that there is a dynamic turning on and off at least one of the advertising units within the framework footprint presented within the viewport while the framework footprint is simultaneously presented with the non-advertising content within the viewport.

24. The method of claim 1, further comprising loading, via the server, responsive to the request, the markup language to the client device such that there is a modification of an area of at least one of the advertising units based on dynamic resizing or dynamic reshaping of the framework footprint while the framework footprint is simultaneously presented with the non-advertising content within the viewport.

25. The method of claim 1, wherein the framework footprint is shaped square, rectangular, or polygonal while the framework footprint is simultaneously presented with the non-advertising content within the viewport.

26. The method of claim 1, wherein loading, via the server, responsive to the request, the markup language to the client device includes dynamically resizing the framework footprint presented within the viewport based on the characteristic while the non-advertising content is presented within the viewport such that at least one of the advertising units within the framework footprint is dynamically resized or dynamically reshaped within the framework footprint while the non-advertising content is presented.

27. The method of claim 1, wherein loading, via the server, responsive to the request, the markup language to the client device includes dynamically reshaping the framework footprint presented within the viewport based on the characteristic while the non-advertising content is presented within the viewport such that at least one of the advertising units within the framework footprint is dynamically resized or dynamically reshaped within the framework footprint while the non-advertising content is presented.

* * * * *